(12) United States Patent
Novais et al.

(10) Patent No.: US 7,321,387 B2
(45) Date of Patent: Jan. 22, 2008

(54) SYSTEM AND METHOD FOR OFFERING IMAGING SERVICES OF A CUSTOMER AND PARTICIPANTS AT A LIVE ENTERTAINMENT EVENT

(75) Inventors: David A. Novais, Penfield, NY (US); John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1395 days.

(21) Appl. No.: 09/918,287

(22) Filed: Jul. 30, 2001

(65) Prior Publication Data

US 2003/0023452 A1    Jan. 30, 2003

(51) Int. Cl.
*H04N 7/18* (2006.01)
*H04N 5/225* (2006.01)
*H04N 5/232* (2006.01)

(52) U.S. Cl. .......... 348/211.11; 348/157; 348/159; 348/207.11; 348/211.99

(58) Field of Classification Search ........ 348/143, 348/157, 159, 207.1, 207.11, 207.99, 211.11, 348/211.99; 382/100; 396/1, 2, 322, 427, 396/429
See application file for complete search history.

(56) References Cited

U.S. PATENT DOCUMENTS

| | | | | |
|---|---|---|---|---|
| 5,469,536 A | * | 11/1995 | Blank | 345/594 |
| 5,587,740 A | * | 12/1996 | Brennan | 348/373 |
| 5,623,581 A | | 4/1997 | Attenberg | 395/106 |
| 5,694,514 A | * | 12/1997 | Evans et al. | 386/46 |
| 6,085,195 A | | 7/2000 | Hoyt et al. | 707/10 |
| 6,204,862 B1 | | 3/2001 | Barstow et al. | 345/473 |
| 6,227,974 B1 | | 5/2001 | Eilat et al. | 463/40 |
| 6,229,904 B1 | | 5/2001 | Huang et al. | 382/100 |
| 6,473,739 B1 | * | 10/2002 | Showghi et al. | 705/26 |
| 6,532,345 B1 | * | 3/2003 | Gluck | 396/427 |
| 6,608,563 B2 | * | 8/2003 | Weston et al. | 340/573.1 |
| 2002/0085762 A1 | * | 7/2002 | Shniberg et al. | 382/224 |

* cited by examiner

*Primary Examiner*—Lin Ye
*Assistant Examiner*—Dan Pasiewicz
(74) *Attorney, Agent, or Firm*—David A. Novais; Roland R. Schindler, II; Kathleen Neuner Manne

(57) ABSTRACT

An imaging system and method which enables viewers and/or attendees of entertainment events, such as athletic events or concerts, to order and obtain photographic products that are associated with the event. The system and method offers attendees at the entertainment event a choice of imaging services, such as a photographic product or photopackage, that includes images of the participants at the entertainment event, as well as images of the attendee and his/her family or friends at the event, preferably at their seats, and preferably while enjoying the event.

8 Claims, 5 Drawing Sheets

SYSTEM AND METHOD FOR OFFERING IMAGING SERVICES OF A CUSTOMER AND PARTICIPANTS AT A LIVE ENTERTAINMENT EVENT

FIELD OF THE INVENTION

The present invention relates to an imaging system and process, and more particularly to a system and process which enables viewers and/or attendees of entertainment events to order and obtain photographic products that are associated with the event.

BACKGROUND OF THE INVENTION

Systems are known where an image of an individual can be associated with a background representative of a location or venue to memorialize his/her visit or attendance at the location or venue. These systems are usually reflective of a single event and are not associated with, for example, the performance of a participant at the event. Further, these systems do not provide an attendee of an entertainment event with photographs of the participants in action or performing during the event, and photographs of the attendee and his/her family and friends which are reflective of that individual's day or night at the event.

Systems are also known which provide customers of amusement park rides such as roller coasters or log water rides with photographs of themselves during certain parts of the rides. However, like the previously described system, these systems do not enable a customer to obtain photographs which are reflective of the customer's attendance at an entertainment event, in particular where the customer is a viewer of a sporting event such as a football game.

SUMMARY OF THE INVENTION

An object of the present invention is to provide for a system and process which offer attendees at entertainment events, such as sporting events or concerts, a photopackage or photographic products which includes images of their day or night "at the game". The photopackage includes images of the participants of the sporting event or concert, as well as images of the viewer and his/her family at the event, preferably at their seats, and preferably taken while the viewer is enjoying the event. The system and the process of the present invention permits the capture of a consumer's image at appropriate moments of capture during an entertainment event. For example, during a basketball game, hockey game, etc., the appropriate moment of capture could be during times of loud volume and/or excitement during the game. The captured image can then be combined in the form of a selected photopackage, with an image of a participant at the event, and preferably an image of the participant in action or performing during the appropriate moment of capture which caused the loud volume and/or excitement.

The present invention therefore relates to a process of offering imaging services to a customer. The process comprises offering at least one imaging service to a customer prior to the customer's attendance at the entertainment event or while the customer is at the entertainment event; recording an imaging service selected by the customer; assigning an identification code to the customer selection, with the identification code including at least information on the selected imaging service and information on a seating location of the customer at the entertainment event; and supplying images to the customer based on the selected imaging service. The images include images of participants in the entertainment event and images of at least the customer while viewing the entertainment event.

The present invention further relates to an imaging services kiosk which comprises an imaging services display section adapted to display a menu of imaging services to a customer; and a customer input section adapted to permit a customer to select an imaging service from the menu of imaging services and enter seating information representative of a seating location of the customer at an entertainment event. The selected imaging service comprises creating images for the customer which includes at least one image of participants at the entertainment event and at least one image of the customer while viewing the entertainment event.

The present invention further relates to an imaging services kiosk comprising an imaging services display section adapted to display a menu of imaging services to a customer, with the imaging services being associated with an entertainment event which will be attended by the customer; an image capture device which is adapted to capture an image of the customer; and a customer input section adapted to permit the customer to select an imaging service from the menu of imaging services, such that the selected imaging service comprises creating a composite image which includes at least one image of the entertainment event and/or at least one image of participants at the entertainment event combined with the customer image captured by the image capture device.

The present invention further relates to an imaging services kiosk comprising an imaging services display section adapted to display a menu of imaging services to a customer, with the imaging services being associated with an entertainment event which will be attended by the customer; an image capture device which is adapted to capture an image of the customer; an input port to permit an uploading of customer images into the kiosk; and a customer input section adapted to permit the customer to select an imaging service from the menu of imaging services, such that the selected imaging service comprises creating a composite image. The composite image includes at least one image of the entertainment event and/or at least one image of participants at the entertainment event combined with at least one of the customer image captured by the image capture device or the uploaded image.

The present invention further relates to a method of displaying images and offering imaging services to a customer while at an entertainment event which comprises: displaying images to a customer at an entertainment event on an interactive display screen in proximity to a seating location of the customer, with the displayed images comprising at least one image of participants in the entertainment event and at least one image of the customer while viewing the entertainment event; and offering an interactive selection session to the customer to permit the customer to select a desired image or images from the displayed images and select a desired image product representative of the desired image or images.

An advantage of such a system and process, as described above, is that it would permit an individual and his/her family or friends to memorialize and enjoy their day or night at the game without having to take pictures themselves, and without having to carry a camera and associated equipment to a crowded stadium or arena. At the same time, users and/or customers of the system of the present invention will have an opportunity to take professional images of the game as well as themselves home with them as a keepsake.

DETAILED DESCRIPTION OF THE INVENTION

As will be described, with the system and process of the present invention, an individual who is planning on attending or who is at an entertainment event, such as for example a basketball game, can prepay and/or select a photopackage or photographic product which includes images of the basketball players in action during the game; as well as images of the individual and his/her family or friends at their seats enjoying the game.

Figure 1:
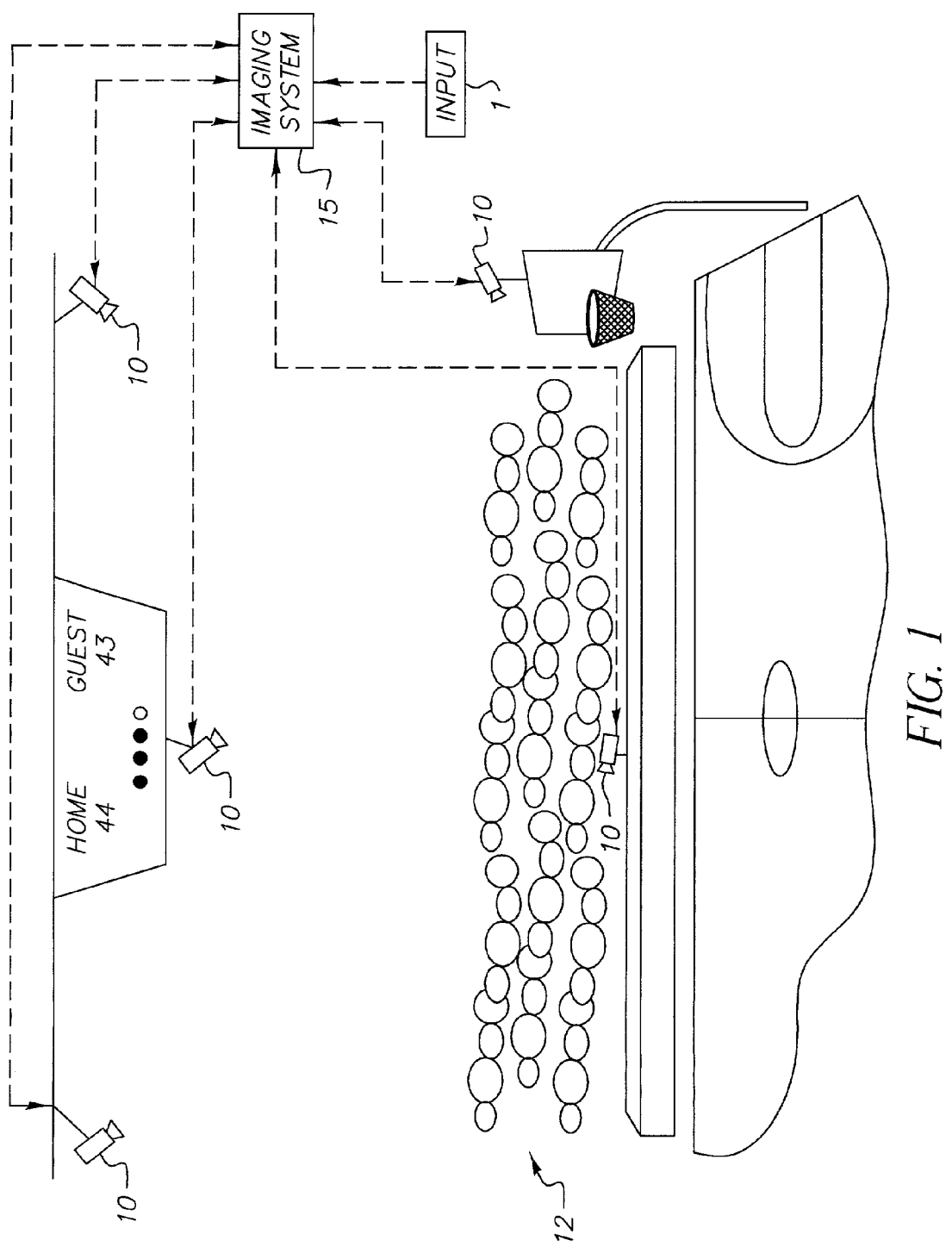
FIG. 1 shows a schematic layout of the system of the present invention including remotely controlled cameras in an arena or stadium in accordance with a feature of the invention.
Figure 2A:
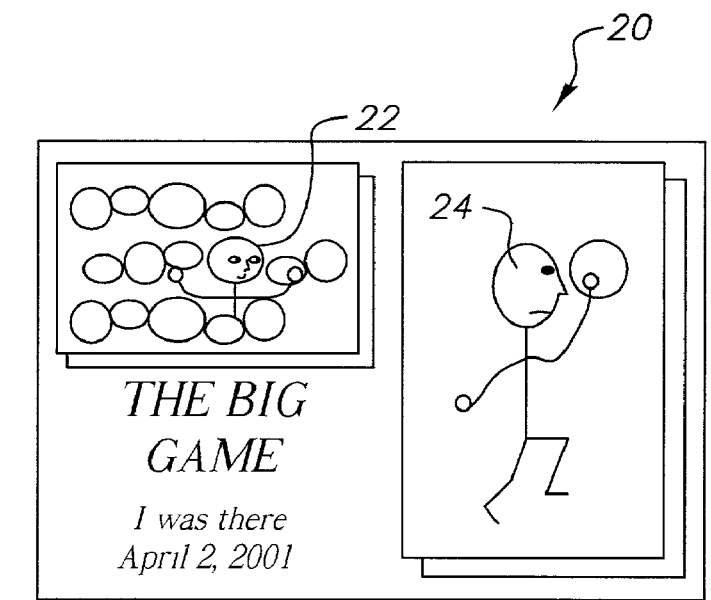
FIGS. 2A-2B show examples of photographic products in accordance with the present invention.
Figure 2B:
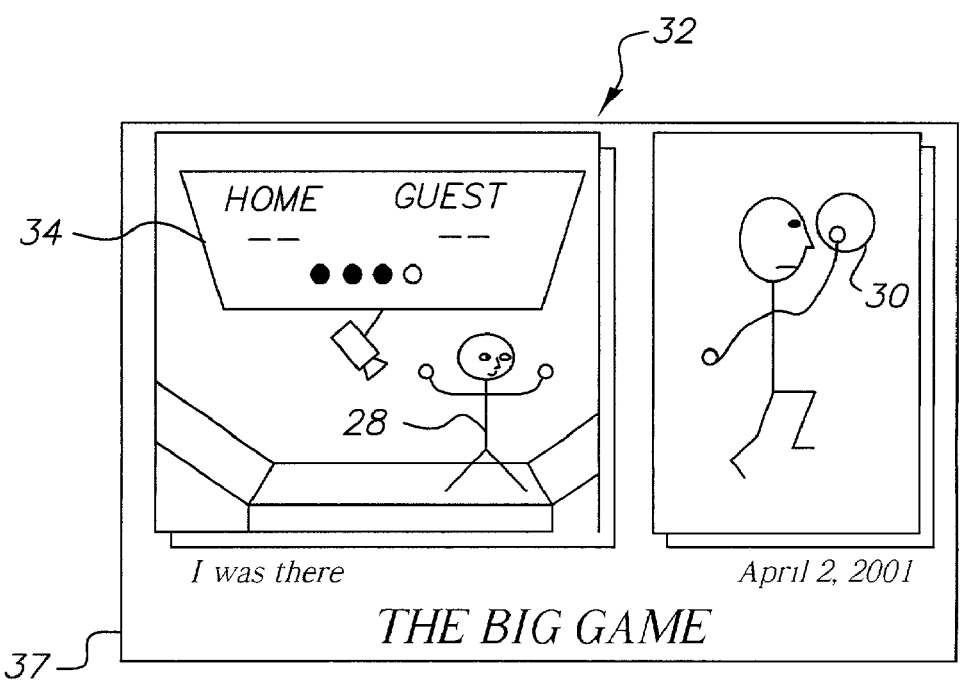
Figure 3:
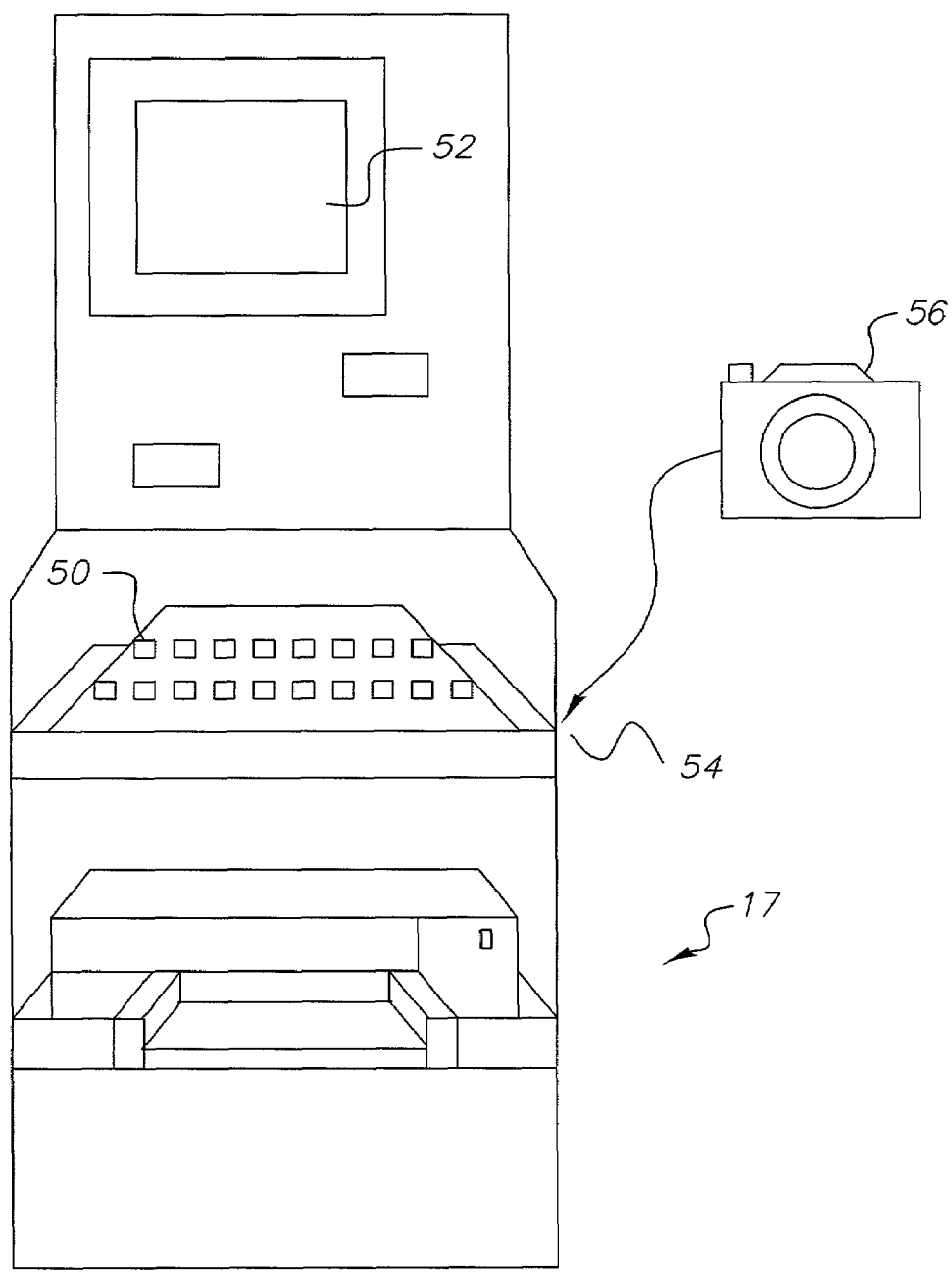
FIG. 3 schematically illustrates a kiosk in accordance with the present invention.

Referring now to the drawings, wherein like reference numerals represent identical or corresponding parts throughout the several views, FIG. 1 schematically illustrates the system of the present invention. As shown in FIG. 1, an input 1 which is reflective of a customer selection at either a kiosk, a home computer or an interactive computer at the entertainment event is provided to an imaging system 15. Imaging system 15 could be located at an arena, stadium or entertainment venue 12 or can be remotely located and networked to venue 12. Imaging system 15 is a controller such as a processor which is adapted to receive the inputted information and control a camera system that includes cameras 10 based on the inputted information. More specifically, the camera system could be comprised of a series of remotely controlled cameras 10 located at different positions at the entertainment venue 12. Each of cameras 10 which are set up throughout arena or stadium 12 could include zoom lenses, and can be networked to imaging system or controller 15 as described above. Based on an imaging service package or photopackage selected by a customer, imaging system or controller 15 can control cameras 10 in a manner in which cameras 10 take photographs of the event as it occurs, as well as photographs of the customer and his/her family or friends while they are "enjoying the game". The images can be taken at random times during the game or at an appropriate moment of capture. As an example, an appropriate moment of capture could be a period of high volume and excitement during the game. These photographs, photographic products or a combination thereof as shown in FIGS. 2A and 2B can be given to the customer as he/she exits arena 12 (for example at a special booth), or viewed on a screen 52 at a kiosk 17 as shown in FIG. 3. If the images are viewed at kiosk 17, selection of desired images by the customer can occur. Photographs could be mailed to the customer, or the images could be e-mailed to the customer's personal computer. Once again, if they are e-mailed, selection and approval may take place.

With reference to FIGS. 2A, 2B, an example of a photopackage or photographic product in accordance with the present invention is shown. As illustrated in FIG. 2A, as part of his/her imaging services, a customer can choose to obtain a composite photograph 20 which includes a picture of the customer 22 in the stands of arena 12 as well as a picture of a participant or participants 24 at the entertainment event. As a further feature, the customer can be given the option to choose a preference as to a favorite team, player, etc. Based on this, the images can be focussed on the customer preferences. In the example of FIG. 2A, participant 24 is a basketball player driving to the basket whose image is captured by a first remote camera 10; while an image of customer 22 is captured by a second remote camera 10 at the instant that the player 24 is driving to the basket. Thus, the picture would be reflective of the customer's expression during an exciting part of the game.

Composite photograph 20 can further include captions or descriptive writing which can be personalized and/or include date, time, location, statistics etc, 26 that are pertinent to the game or event.

As will be explained later, one method for locating the customer in the stands is through the use of the customer's ticket which would include a seating location. This information can be included in an identification code associated with the customer and be provided to imaging system or controller 15. The identification code would also include information on the service and/or products selected by the customer.

As a further option, as will also be described later, rather than having to locate the customer at this seating location, as shown in FIG. 2B, the customer can choose to have his/her image 28 combined with a preexisting image 34 of the arena or stadium where the customer will be watching the event. Thereafter, an image 30 of the participant taken during the event could be combined with the image 28 of the customer and the image 34 of the arena to form photographic product 32. Similar to FIG. 2A, as shown in FIG. 2B a written caption, personalized information etc. 37 could be provided on photographic product 32.

Figure 4A:
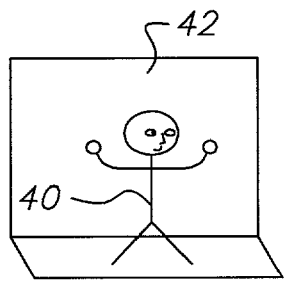
FIGS. 4A-4B illustrates further examples with respect to a photographic product in accordance with the present invention.
Figure 4B:
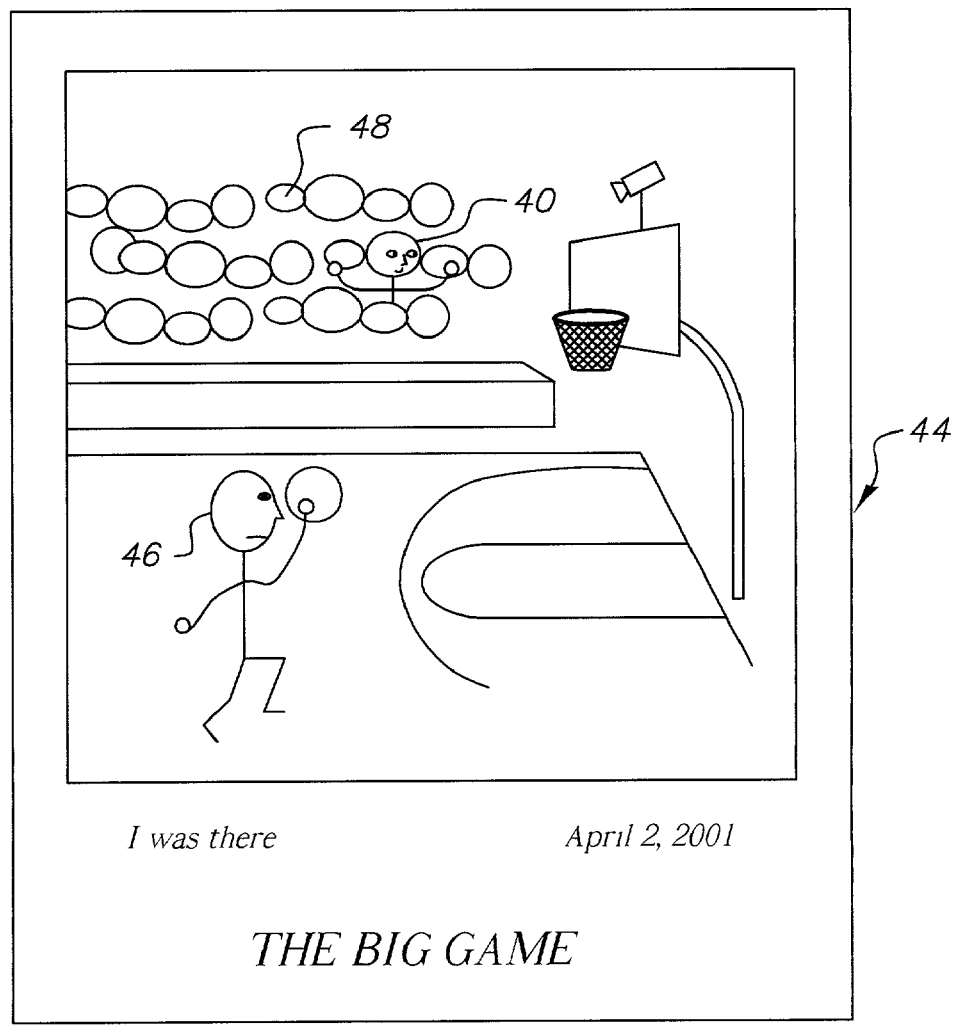

With reference to FIG. 3, in a further feature of the invention, a customer could have an image of himself or herself, as well as family or friends captured at a kiosk 17. Kiosk 17 can be enabled with a capture device in the form of an internal camera that captures images of a customer 40 against a green screen 42 as shown in FIG. 4A. The image of customer 40 can then be separated from the background for use in a composite image 44 as shown in FIG. 4B. Composite image 44 is created from the combination of the customer's captured image as shown in FIG. 4A and other images of activity at the event. As an example, the other images could be of a basketball player 46 in action during a game attended by the customer which would be combined with the customer's image 40 captured at the kiosk, or preexisting images of fans 48 at the arena. As shown in FIG. 4B, the customer's image 40 could be superimposed with images of fans 48 sitting in the stands to give the impression that the image was taken at the time of the action at the arena. The images of activity (basketball player 46) at the event are captured by remote cameras 10 (FIG. 1) positioned throughout the arena. As described, images previously captured by means other than the aforementioned networked cameras may also be included.

As previously described, kiosk 17 may also capture the image without the green screen. When this image is captured, the location of the kiosk 17 is chosen such that the background of the image of the customer is indicative of the event or arena. For example, a scoreboard or stadium logo may be included in the background as shown in FIG. 2B.

The images of the customer and the event using any of the processes noted above, can then be included in photopackage or photographic product 20, 32 as shown in FIGS. 2A, 2B. The photopackage may be a selection of individual images or a composite image or an image-bearing album. The photopackage may also be a DVD or email containing the images.

In a preferred embodiment, cameras 10 in arena 12 capture key moments in the performance or sporting event. An operator of cameras 10 through imaging system or controller 15 can select the images captured by cameras 10 and indicates them for inclusion in the photopackage for the customer. The operator may also insure that images of the customer are taken or have been taken at appropriate times to show the customer enjoying the event. It is also possible that the customer may select the desired images at kiosk 17 after or during the event, or may select the desired images remotely from the entertainment event, such as over the Internet from a home PC. The customer may also wish to change selections on the basis of the actions in the event. Scores and dates and other text data may also be included.

As a further option, in the customer's selection of the photopackage whether at his/her home PC, at a ticket counter, at an interactive display at his/her seat at the event, or at kiosk 17, the customer can select a preferred team or performer. Different images and text may be highlighted or provided for selection by the customer on the basis of this selection. Using the example of a football game, if the customer selects the home team, the border or graphics of the image or images would be comprised of the team colors, the images selected for inclusion in the photopackage would be of scoring plays by the home team, and the score of the game is highlighted if the home team wins. Conversely, if the customer selects the away team, the border or graphics on the images would be that of the away team, the images selected for inclusion in the photopackage would be of scoring plays by the away team, and the score of the game would be minimized if the home team wins. Similarly for the example of a ballet, if the customer selects the prima ballerina as the performer of interest, her image will be featured in the photopackage.

Note that the selections of customer preferences can be made at a home PC, or at kiosk 17. Seat numbers may also be noted so that the system can take pictures of the individuals in the particular seats noted.

With respect to the feature in which the system captures images of the customer as he observes the event, kiosk 17 at the arena or stadium would offer choices of imaging services to a customer through a display screen 52 and a customer input section 50 on kiosk 17 (FIG. 3). This permits the customer to select preferences and pay for selected services at kiosk 17. Therefore, after the customer enters an arena and before he goes to his/her seat, the customer can start an interactive session at kiosk 17. Kiosk 17 can offer a customer a menu of imaging services. That is, kiosk 17 can be adapted to offer several photopackage choices on screen 52 and permit the customer to select one of the imaging services through the use of customer input section 50. For example, choice A could be 3 images of participants in action at the event and 2 images of the customer's family or friends while watching the event. Other choices can permit the customer to enter preferences, and can offer more images and other products such as mugs, T-shirts etc. to the customer. Still further choices can offer the creation of photoalbums, posters, or a personal program, which includes the images.

This selection process gives the customer the ability to personalize his photopackage by permitting the customer to input his or her preferences with regard to the participants at the event. For example, at kiosk 17 the customer can enter information such as which is his/her favorite team, which is his/her favorite player etc. In this scenario, the images included in the photopackage would correspond to the customer's personalized choices. Address information is also collected if the delivery means is to be by mail. Email addresses may be collected if notification and approval are to be provided by electronic means. Cell phone number may also be collected.

The photopackage may include multimedia content. For example, the photopackage may be a DVD disk with sound and video in addition to still images. As a still further example, an image of a basketball player dunking a basketball can include a short sound recording of the play as it actually occurred. Included sound may also be of a sportscast of the event.

After entering his/her choices, a customer can enter his ticket or seat number from the ticket stub or pass the ticket stub over a scanner at kiosk 17 which records the ticket or seat number. Note that the ticket may be scanned so that the appropriate location can be used for the purposes of image capture. Additionally, the image of the ticket itself may be included in the photopackage. Based on the ticket number, the service provider will know where the customer is sitting. Also, in response to the customer's choices, the service provider can record the selected imaging service and assign an identification code to the selection. This identification code could include at least information on the selected imaging service and information on the seating location of the customer. Kiosk 17 can also create a customer profile that includes the information on the customer's seating location as well as his/her choice of imaging services. The service provider can then create a photopackage of images which includes, for example, images of players in action during the game and images of the customer and his/her family while watching the game. If customer preferences are entered, the appropriate moments of capture of the customer image could focus on those images in which the customer's favorite player or team were featured. The images of the family at their seating location are possible since the service provider would know the seat location of the customer based on the ticket number. Cameras 10 can then be used to take the images of the family at their seats.

There is a possibility that the customer will not be in his/her seat if the images are captured randomly. This issue can be resolved by many methods. First, many images may be captured, and the customer or an operator may select the desired image or images at the kiosk or at a networked home PC. Second, an indication of time of capture may be provided on the scoreboard or other means. A particular time may be noted as the time of capture for the entire arena, and it will be the customer's responsibility to be in his seat at that time. If the green screen method noted above has been employed, the customer image previously captured may be inserted into a template of an image of the stands.

In a further feature of the invention as shown in FIG. 3, kiosk 17 can include a camera input port 54 to permit an upload of images from a digital or hybrid camera 56 or a picture card or disk. In this case, a customer can download an image of himself or herself from camera 56. The downloaded image can then be inserted into a template that, for example, includes a background of the arena (FIG. 2B), or a background of fans in the stands (FIG. 4B). This image can then be combined with an image of a participant performing at the event (FIG. 2B) and text can be appropriately added to the photographic product.

After the game or event, the customer can pick up and/or proof his/her image products or photo package at a booth set up at the arena, can have negatives and/or prints mailed to his/her home, or can have the images e-mailed to his/her computer. In a preferred embodiment, the customer receives a low-resolution or watermarked image of the photopackage via e-mail. The customer approves the photopackage or indicates what is incorrect and replies with this information. The service provider acts in accordance with the customer's wishes. In this fashion, waste is reduced and customer satisfaction is assured. Note that watermarking and low-resolution degradation of the photopackage is not necessary if payment has been made previously.

In a further feature of the invention, the system and process can be practiced by way of a cell phone. That is, a customer can go on-line by way of his/her cell phone and make the choices noted above. The customer can also indicate the desired time for capture via cell phone. When the customer is in his/her seat and determines the time to be appropriate for image capture, he can make a call to the service provider. After the image or images are captured, the service provider can verify that the capture has been made by a return call.

Figure 5:
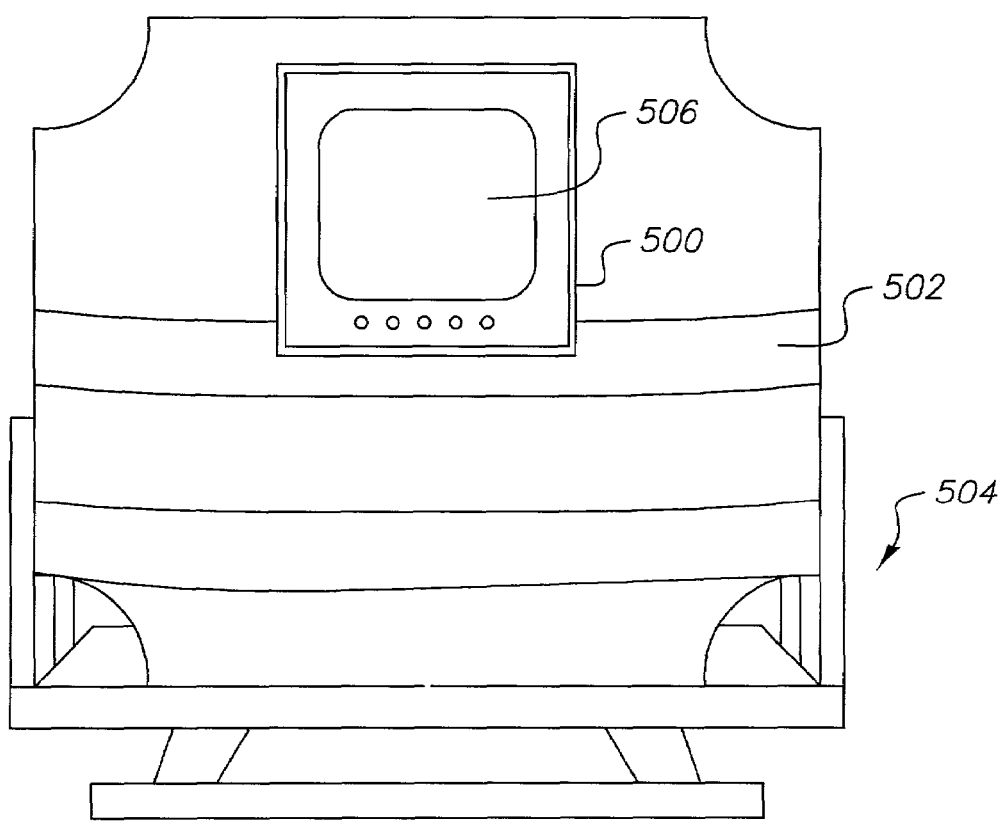
FIG. 5 illustrates an interactive computer module in accordance with a further feature of the invention.

In a further feature of the invention, the service provider can take advantage of computer modules with interactive displays that are now incorporated into selected seats in some arenas. These computer modules 500 as shown in FIG. 5 presently permit fans that are attending games to get interactively involved in the game by voting for things such as Most Valuable Player or other game related awards. These computer modules 500 further permit fans to order food and drinks from their seats on the computer module during the game. In a preferred embodiment, computer module 500 could be incorporated into the back 502 of a seat 504 at an arena, or can be placed in between the adjacent seats in the vicinity of the arm of the seat. Using the example in which the computer module is incorporated into the back of a seat, a user seated in the seat behind seat 504 could view and operate computer module 500. When using an interactive display on computer module 500, the service provider can periodically display images to the customer during the game on display 506 of computer module 500. These images could be action images of the players in the game or images of the customer and his/her family while watching the game. The customer could select images that he/she likes via a touch-screen or control panel on computer module 500 and also could be presented with option packages as outlined above. The customer can also select the method of delivery. Appropriate methods of delivery for all the disclosed embodiments could include e-mail, picking up the package at a booth at the arena or stadium after the event, picking up the package at a retail outlet at a convenient time after the event, or regular mail.

Additionally, all the functions previously described as being available through a kiosk could be provided through the computer module with interactive display. If a camera is added to the module, the capture of the customer's image by the computer module is possible.

Therefore, the present invention provides for a process and system that permits a family and friends to memorialize their day or night at the game without having to take pictures themselves. That is, with the process and system of the present invention, a family or individual (customer) attending an entertainment event, such as a basketball game, baseball game, football game etc., simply selects his/her desired imaging service and can fully enjoy the game without having to worry about the appropriate time to take pictures. This system also enables an individual who may have left his/her camera at home to take photographs of the event. Further, with the system and process of the present invention, the customer will have the opportunity to take professional images of the game as well as pictures of himself, herself, family and/or friends home as a keepsake. The customer can make his/her selections at the entertainment event or at a location remote from the site of the entertainment event.

The invention has been described in detail with particular reference to certain preferred embodiments thereof, but it will be understood that variations and modifications can be effected within the spirit and scope of the invention.

What is claimed is:

1. A method of offering imaging services to a customer, the method comprising:
   offering at least one imaging service to a customer for selection prior to the customer's attendance at an entertainment event or while the customer is at the entertainment event;
   recording an imaging service selected by the customer and assigning an identification code to the customer selection, said identification code including at least information on the selected imaging service and information inputted by the customer on a seating location of the customer at the entertainment event; and
   supplying images to the customer based on the selected imaging service, said images including images of participants in the entertainment event and images of at least the customer at said seating location while viewing the entertainment event.

2. A method according to claim 1, wherein said step of supplying images to the customer includes the steps of:
   setting up remotely controlled cameras throughout a venue at which the entertainment event is to take place; and
   using the cameras to take photographs of the event as it occurs and photographs of participants in the event as it occurs based on the selected imaging service.

3. A method according to claim 2, wherein said step of supplying images to the customer further includes the step of:
   using the cameras to take photographs of the customer at his/her seating location while viewing the event based on the seating location information.

4. A method according to claim 1, wherein said information on the selected imaging service includes information reflective of a customer preference with regard to the participants at the entertainment event.

5. A method according to claim 3, wherein said photographs are taken at an appropriate moment of capture which is reflective of a period of high volume and/or excitement during the entertainment event.

6. A method according to claim 1, wherein said seating location of the customer at the entertainment event is determined by scanning a ticket.

7. A method according to claim 1, wherein said selections of images of the entertainment event are made by the customer at a location remote from the site of the entertainment event.

8. A method according to claim 1, wherein;
   supplying images to the customer comprises displaying images to the customer at the entertainment event on an interactive display screen accessible at the seating location of the customer, said displayed images comprising at least one of images of participants in the entertainment event and images of the customer while viewing the entertainment event; and
   offering an interactive selection session to the customer to permit the customer, while seated at the seating location, to select a desired image or images from the displayed images and select a desired image product representative of the desired image or images.

* * * * *